United States Patent [19]

King

[11] 3,913,830
[45] Oct. 21, 1975

[54] MIXER VALVES
[75] Inventor: Victor Howard George King, Ilford, England
[73] Assignee: Barking Brassware Co. Limited, Essex, England
[22] Filed: Jan. 14, 1974
[21] Appl. No.: 433,209

[30] Foreign Application Priority Data
Jan. 15, 1973 United Kingdom................. 2053/73

[52] U.S. Cl.............................................. 236/12 R
[51] Int. Cl.² ....................................... G05D 23/00
[58] Field of Search.... 236/12 R; 137/630.19, 625.4

[56] References Cited
UNITED STATES PATENTS
| | | | |
|---|---|---|---|
| 3,388,861 | 6/1968 | Harding | 236/12 R |
| 3,765,604 | 10/1973 | Trubert et al. | 236/12 R |
| 3,792,812 | 2/1974 | Knapp | 236/12 R |

Primary Examiner—William E. Wayner
Assistant Examiner—Henry C. Yuen
Attorney, Agent, or Firm—Brisebois & Kruger

[57] ABSTRACT

In a mixer valve for a shower fitting a duplex metering valve member and a thermostat element are mounted between two springs. When the mixer is in operation one of the springs is held in a prestressed condition so that all movement of the duplex metering valve member is accommodated by the other spring. When the mixer is turned off the hot water inlet closes first to prevent a mixed water outflow at scalding temperature, and then the mixed water outflow is itself stopped by an outlet valve member. An adjuster is provided between the outlet valve member and the duplex metering valve member for accommodating minor variations in component machining and for setting the maximum temperature of the mixed fluid flow when the mixer is fully on.

8 Claims, 1 Drawing Figure

U.S. Patent  Oct. 21, 1975  3,913,830
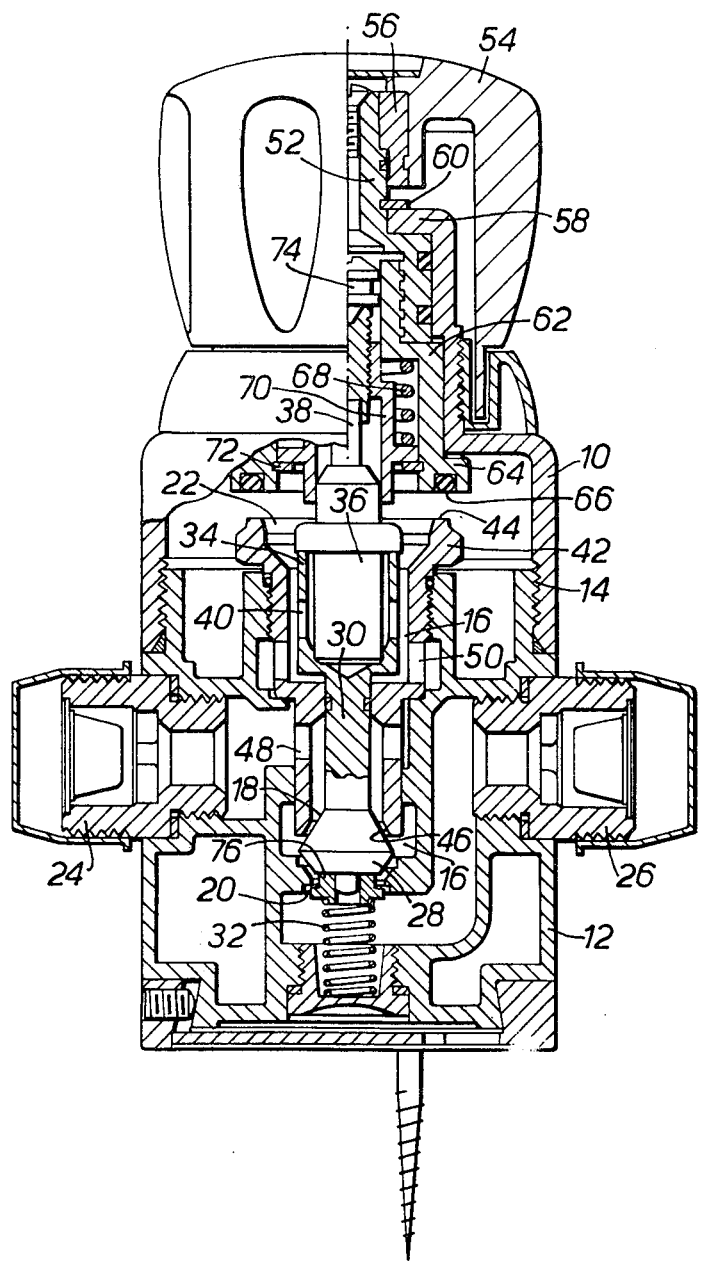

MIXER VALVES

This invention relates to mixer valves and has especial but not exclusive reference to mixer valves for mixing and controlling water fed to shower heads.

The present invention seeks to provide an efficient and reliable mixer valve.

According to the invention a mixing valve includes
a valve body defining a mixing chamber having a pair of inlets for fluids to be mixed and an outlet for mixed fluid,
an inlet valve member movable to vary inversely the openings of the inlets,
an outlet valve member movable to open and close the outlet as desired,
control means for moving the outlet valve member,
first resilient means disposed between the inlet valve member and the valve body, and
second resilient means opposing the first resilient means and disposed between the inlet valve means and the control means,
wherein the second resilient means is held in a prestressed condition whilst the outlet is open, the arrangement being such that operation of the control means to close the outlet first overcomes the first resilient means and closes one of the inlets, and then overcomes the second resilient means and closes the outlet.

The first and second resilient means may each comprise at least one compression spring.

The control means preferably incorporates an adjuster for setting the position of the inlet valve member relative to the control means when the outlet is open. In use, the adjuster may be set such that when the outlet valve member is in the fully open position the inlet valve member is so positioned as to limit the opening of one of the inlets. It may be desirable that this adjuster be concealed during normal operation of the mixer valve so that once set it cannot easily be tampered with.

The invention is advantageously applied to a mixer valve which incorporates a thermostat element arranged to sense mixed fluid temperature and to cause movement of the inlet valve member relative to the control means. In this case the adjuster is preferably disposed between the thermostat element and the control means.

The second resilient means may comprise a compression spring held within a sleeve by an inner member capable of limited movement axially of the sleeve. The sleeve may carry the outlet valve member. The inner member may engage the thermostat, in which case the inner member may incorporate the adjuster. Preferably the adjuster comprises a screw mounted in the inner member and arranged to engage the thermostat element. The control means may be of the non-rising spindle type restrained axially by the valve body and arranged to drive the sleeve when rotated relative the valve body.

By way of example only, one embodiment of the invention will now be described with reference to the accompanying drawing, which is an elevation, mainly in section, of a mixer valve for mixing hot and cold water and controlling the flow of the mixed water to a shower fitting (not shown).

Referring to the drawing, the body of the mixer valve is in two parts 10, 12 which screw together as at 14. The lower body part 12 defines a mixing chamber 16 having opposed cold and hot water inlets referenced 18 and 20 respectively, and a mixed water outlet 22. The inlets 18, 20 are connected via passages within the lower body part 12 to cold and hot water coupling adapters 24, 26 which, in the drawing, are shown with protective transit caps.

Disposed between the inlets 18, 20 is a duplex inlet valve member 28 carried by a stem 30 which is slidable in the lower body part 12. A first compression spring 32 is disposed between one end of the inlet valve member 28 and the lower body part 12 and resiliently urges the inlet valve member away from the hot water inlet 20 and towards the cold water inlet 18. At the other end of the stem 30 is an open-ended cylindrical portion 34 which houses a thermostat comprising a body 36 and an axially disposed pin 38. Ports 40 in the cylindrical stem portion 34 allow mixed water flowing to the outlet 22 to contact the body 36 of the thermostat.

An insert 42 screwed into the lower body part 12 has machined at one end a valve seating 44 for the mixed water outlet 22, and at the other end a valve seating 46 for the cold water inlet 18. In the walls of the insert 42 are ports 48 interconnecting the cold water adapter 24 and the cold water inlet 18, and ports 50 enabling water in the mixing chamber to flow from the vicinity of the inlet valve member 28 to the ports 40 and the outlet 22.

The upper body part 10 supports a control member 52 on which a control knob 54 and annular insert 56 are a snap-on fit. A radially inwardly extending annular ring 58 at the top end of the upper body part 10 is trapped between a shoulder on the control member 52 and a circlip 60; thus the control member 52 and control knob 54 can rotate but cannot move axially.

An internal butress thread on the control member 52 engages a corresponding external thread on a sleeve 62. The sleeve 62 is keyed to the upper body part 10 to prevent relative rotation; thus rotation of the control knob 54 will move the sleeve 62 axially. At the lower end of the sleeve 62 is an outlet valve member 64 having an annular washer 66 in axial alignment with the seating 44.

To provide resilience between the thermostat pin 38 and the outlet valve member 64, a second spring 68 is provided. The second spring 68 is trapped between a radial surface of the sleeve 62 and a radial surface of an inner member 70, the inner member 70 being axially slidable within the sleeve 62 and being retained therein by a circlip 72. An adjustment screw 74 is screwed into the inner member 70 and engages the thermostat pin 38.

In the drawing the outlet 22 is shown fully open, a shoulder of the sleeve 62 being in contact with the lower end of the control member 52. The second spring 68 is held in a partially pre-compressed condition by the inner member 70 and circlip 72, the degree of compression being sufficient to ensure that in normal operation all expansion and contraction of the thermostat is accommodated by the first spring 32. Thus, with the outlet 22 fully open, small changes in the temperature of mixed water flowing past the thermostat body 36 cause the thermostat to move the duplex valve member 28 to vary inversely the openings of the cold and hot water inlets 18, 20 so as to maintain a substantially constant mixed water temperature. The maximum level of this temperature is preset by adjustment of the screw 74, but of course the mixed water temperature can be reduced below this maximum level by the action of the control knob 54 A particular advantage provided by the adjustment screw 74 is that it can influence the maximum possible opening of the hot water inlet and thus play a part in protecting the thermostat from damage caused by overheating. Accordingly the reliability of the mixer is improved. As will be apparent from the drawing the adjuster screw is normally concealed so as to discourage tampering.

When it is desired to stop the flow of mixed water the control knob 54 is rotated to cause the sleeve 62 to descend as viewed in the drawing. This movement is transmitted via the adjustment screw 74 and the thermostat to the duplex valve member 28 which is brought down onto, and closes, the hot water inlet 20. Continued movement of the control knob 54 causes the lower end of the inner member 70 to contact the thermostat body 36 whereupon the precompression of the second spring is overcome and the outlet valve member descebds onto the seating 44. All water flow from the mixer has now ceased. Establishment of direct contact between the inner member 70 and the thermostat body 36 relieves the thermostat pin 38 of the full loading it would otherwise experience during closure of mixed water outlet 22. It will be appreciated that upon reversal of movement of the control knob the outlet 22 will open first, allowing an initial flow consisting only of cold water from the inlet 18; only upon further movement of the control knob will the hot water inlet 20 open. Thus a user of the shower fed by the mixer will be protected from initial scalding. Further protection from scalding is of course afforded by the operation of the thermostat in the manner already described, and also by an auxiliary valve member 76 carried by the duplex valve member 28.

By using the pre-compressed second spring 68 the mixer valve can be constructed more cheaply because the axial spacing of the seating 44 and the hot water inlet 20 is not critical. Further, because the spring 68 is inactive whilst the outlet 22 is open, the first spring 32 may be of relatively low rate to facilitate easy operation of the thermostat, yet the second spring 68 may be of a relatively much higher rate, ensuring effective closure of the hot water inlet 20 even against high hot water pressures. The latter virtue is important in preventing pollution of the cold water system by thermally-induced cross-circulation or pressure-induced cross-tracking.

Another and very considerable advantage of the inactivity of the second spring 68 whilst the outlet 22 is open is that the position of the duplex valve member relative to the cold and hot water inlets 18, 20 is no longer subject to the vagaries of spring characteristics but instead, for any given setting of the control knob 54, is determined solely by the thermostat and the adjustment screw 74; thus automatic temperature control will be more efficient and reliable. And additionally temperature modulation by movement of the control knob 54 can be more accurately accomplished.

It will also be appreciated that should the thermostat for any reason be subjected to extremely high temperature, any excessive expansion can be accommodated by the upper spring 68 so that the thermostat is less likely to suffer permanent damage.

I claim:

1. A mixing valve comprising in combination a valve body defining a mixing chamber having a pair of inlets and an outlet for mixed fluid,
   an inlet valve member movable to vary inversely the openings of the inlets,
   an outlet valve member movable to open and close the outlet as desired,
   control means for moving the outlet valve member,
   a thermostat element arranged to sense mixed fluid temperature and to cause movement of the inlet valve member relative to the control means,
   first resilient means disposed between the inlet valve and the valve body, and,
   second resilient means opposing the first resilient means and disposed between the inlet valve means and the control means,
   wherein the second resilient means is held in a prestressed condition while the outlet is opened, the arrangement being such that operation of the control means to close the outlet first overcomes the first resilient means and closes one of the inlets, and then overcomes the second resilient means and closes the outlet.

2. A mixer valve according to claim 1 wherein there is provided an adjuster for setting the position assumed by the inlet valve member relative to the control means when the outlet is closed, and wherein the adjuster is disposed between the thermostat element and the control means.

3. A mixer valve according to claim 1, wherein the second resilient means comprises a compression spring held within a sleeve by an inner member capable of limited movement axially of the sleeve.

4. A mixer valve according to claim 3, wherein the sleeve carries the outlet valve member.

5. A mixer valve according to claim 3, wherein the inner member engages the thermostat element.

6. A mixer valve according to claim 5, wherein the inner member incorporates the adjuster.

7. A mixer valve according to claim 6, wherein the adjuster comprises a screw mounted in the inner member and arranged to engage the thermostat element.

8. A mixer valve according to claim 3, wherein the control means is so mounted as to be capable only of rotational movement relative to the valve body and is arranged to move the sleeve axially of the body when so rotated.

* * * * *